(No Model.)
E. P. TURNER.
TORPEDO HOLDER.
No. 493,455. Patented Mar. 14, 1893.
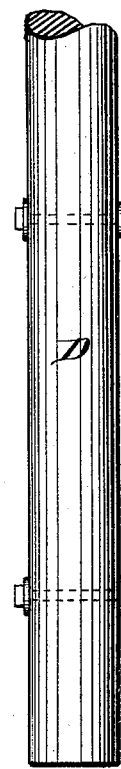
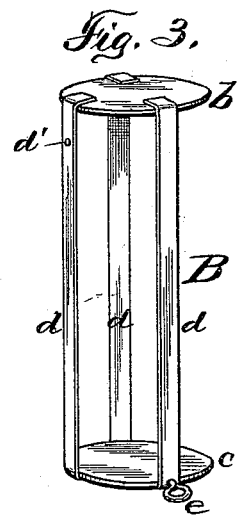
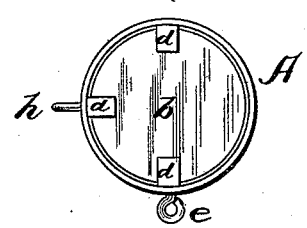
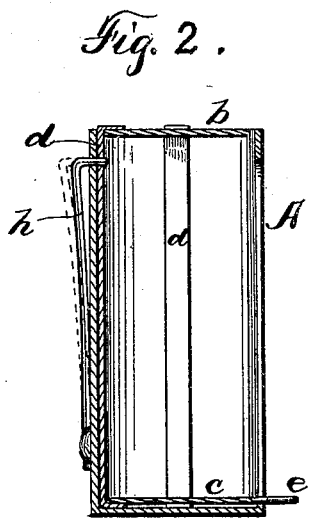
WITNESSES:
INVENTOR,
Eugene P. Turner
BY
Smith & Benson
ATTORNEYS

UNITED STATES PATENT OFFICE.

EUGENE P. TURNER, OF ELMIRA, NEW YORK.

TORPEDO-HOLDER.

SPECIFICATION forming part of Letters Patent No. 493,455, dated March 14, 1893.

Application filed May 16, 1892. Serial No. 433,224. (No model.)

*To all whom it may concern:*

Be it known that I, EUGENE P. TURNER, of Elmira, in the county of Chemung, in the State of New York, have invented new and useful Improvements in Torpedo-Holders, of which the following, taken in connection with the accompanying drawings, is a full, clear, and exact description.

My invention relates to devices for holding and carrying torpedoes, such as are used by railway employés, and are attached to the rails to give signals of danger: and my object is to provide a holder to be attached to the guard wires of a lantern, or to the staff of a brakeman's flag.

My invention consists in the several novel features of construction and operation hereinafter described and which are specifically set forth in the claims hereunto annexed. It is constructed as follows, reference being had to the accompanying drawings, in which Figure 1, is a side elevation of the holder partly opened, mounted upon a flag-staff. Fig. 2, is a vertical transverse section of the holder, closed—detached. Fig. 3, is a plan elevation of the cage, detached. Fig. 4, is a top plan of the holder.

A—, is the outer casing, consisting of a tube, closed at the bottom and open at the top, and provided with the vertical slot —a—. Within this casing I place the cage —B— consisting of the heads —b—c—, and connecting bars —d—; and a handle —e—, usually attached to the cage, after it has been placed in the casing, being inserted through the slot —a—. This handle is used for lifting the cage, for the insertion of the torpedoes —f— or their removal therefrom.

Upon the casing I secure a spring catch —h— here shown as consisting of a wire having its free end bent as shown, and adapted to pass through a hole in the casing and enter a hole —d'— in one of the bars of the cage and lock the cage in the casing. When it is sprung out of the hole —d'—, the cage can be lifted, and then this catch will bear against the bar —d— and operate as a friction brake to retain the cage in its raised position.

In the drawings it is shown as mounted upon the flag staff —D— by the wires —m—, secured to said staff and to the casing. It will also be seen, without specific illustration that the holder can be rigidly or detachably secured to the guard wires of a lantern, and operated in the same manner. It will also be seen that I can change the form of the casing and cage to adapt them to the different shapes and styles of torpedoes.

What I claim as my invention, and desire to secure by Letters Patent, is—

1. A torpedo holder, consisting of a casing, and a vertically movable cage inserted therein, comprising heads and bars connecting them, in combination.

2. A torpedo holder, comprising a casing, provided with a vertical slot, a cage within the casing and vertically movable therein and a handle inserted through the slot and connected to the cage, in combination.

3. A torpedo holder, comprising a casing provided with a vertical slot, a cage within the casing and vertically movable therein, a handle inserted through the slot and connected to the cage, and a spring catch mounted upon the casing and adapted to engage with the cage, in combination.

In witness whereof I have hereunto set my hand this 2d day of April, 1892.

EUGENE P. TURNER.

In presence of—
C. W. SMITH,
HOWARD P. DENISON.